Sept. 7, 1948.  J. E. MASON  2,448,538
CYCLIC REGULATION OF CRYSTALLIZERS
Filed Sept. 20, 1943
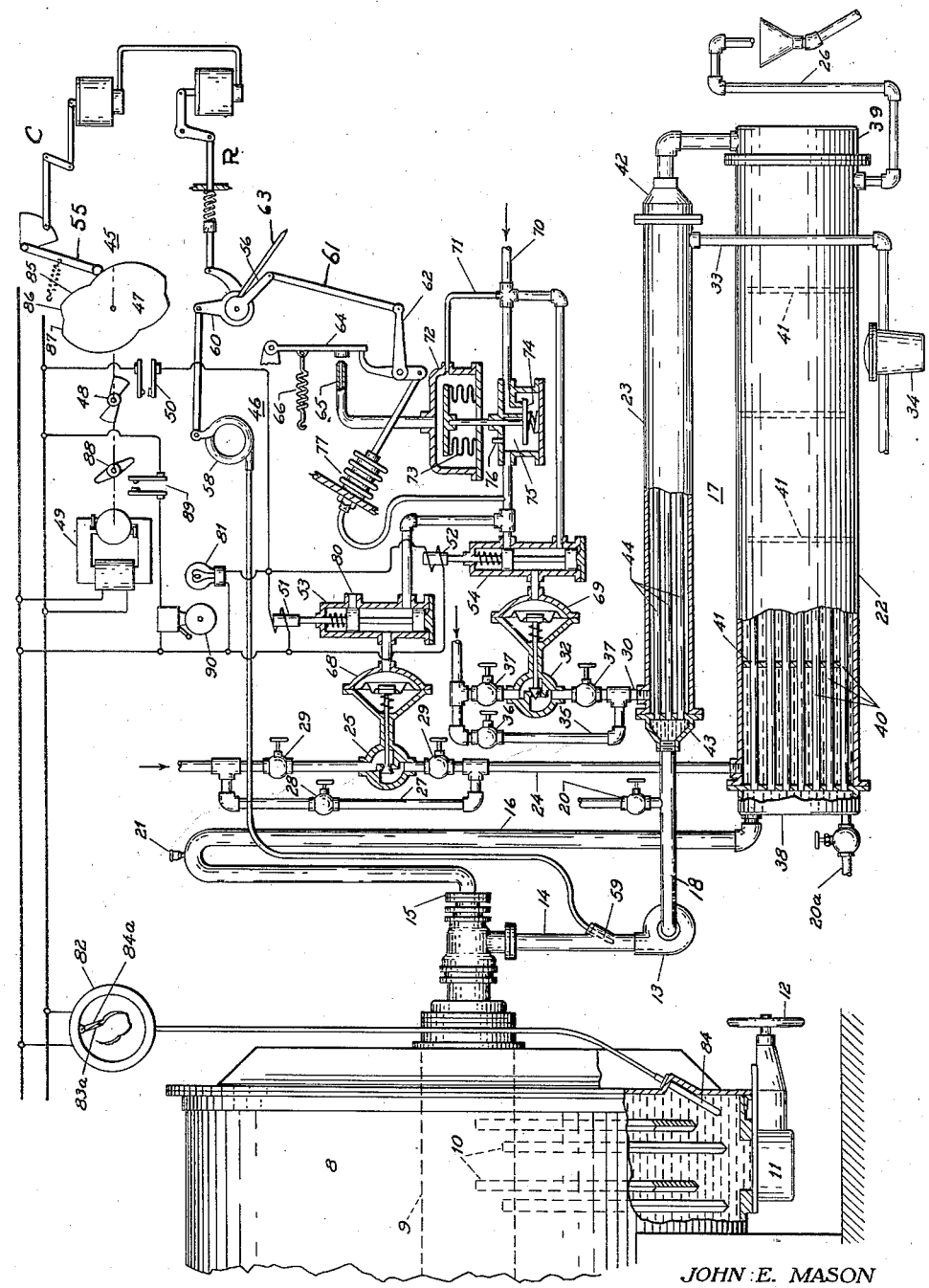
JOHN E. MASON
INVENTOR.
BY *A. A. McGrew*
ATTORNEY Patented Sept. 7, 1948

2,448,538

UNITED STATES PATENT OFFICE 2,448,538

CYCLIC REGULATION OF CRYSTALLIZERS

John E. Mason, Denver, Colo., assignor to The Stearns-Roger Manufacturing Company, Denver, Colo., a corporation of Colorado Application September 20, 1943, Serial No. 503,085

12 Claims. (Cl. 257—4)

My invention relates to apparatus for crystallizing sugar and other granular materials, and particularly to automatic control equipment for such apparatus.

In the manufacture of sugar from sugar beets, for example, the extracted juices are boiled to concentrate them, the final boiling being accomplished in a vacuum pan. The concentrated liquid, which may be "massecuite" or other mother liquor, is then placed in a crystallizer where it is cooled at a rate suitable for the growth of the desired size of crystals. After the crystallization has been completed the mixture of crystals and mother liquor is again heated sufficiently to facilitate its removal from the crystallizer. It is difficult to regulate the heating and cooling operation efficiently and highly trained operators are required. Accordingly, it is an object of my invention to provide a crystallizer including an improved arrangement for controlling automatically the cooling and heating operations thereof.

It is another object of my invention to provide a crystallizer having a closed circuit for continuously circulating a heat transfer fluid therein and including an improved arrangement for selectively heating and cooling the fluid in the closed circuit.

It is a further object of my invention to provide a crystallizer having an improved heat exchange system for automatically controlling the temperature of the substance to be crystallized and for indicating the termination of the crystallizing cycle.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing, the single figure of which represents diagrammatically a sugar crystallizer provided with a controlling apparatus embodying my invention.

Briefly, the apparatus illustrated in the drawing comprises a crystallizer tank provided with a heat transfer element and a closed system for circulating a heat transfer fluid through the element. Separate heat exchangers are provided for heating and cooling the heat transfer fluid, and an automatic control is provided to determine the cycle of operation and for maintaining temperatures of the heat transfer fluid in accordance with the demands of the cycle. The heating and cooling heat exchangers are connected so that the circulated heat transfer fluid passes through them in series. The automatic control selects the heat exchanger to be placed in operation for each portion of the crystallizing cycle and also controls the rate of change of temperature of the heat transfer fluid effected by operation of the heat exchanger.

Referring now to the drawing, the crystallizing apparatus illustrated comprises a crystallizer tank or drum 8 having a rotatable heat transfer element 9 mounted therein. The element 9 is provided with paddles or blades 10 through which the heat transfer fluid is circulated in heat exchange relation with the mother liquor or massecuite in the tank. The crystallizer tank illustrated is described and claimed in the co-pending application of John E. Mason et al., Serial No. 451,530, filed July 20, 1942 and assigned to the same assignee as the present invention. The tank 8 may be filled with mother liquor through a suitable charging door (not shown) and may be emptied through an outlet 11 by operation of a gate valve provided with a hand wheel 12.

In order to change the temperature of the mother liquor in the drum 8, heat transfer fluid or medium is supplied to the unit 9 by operation of a pump 13 driven by a suitable motor (not shown). The pump is arranged in a closed fluid circuit including a discharge connection 14, the heat transfer element 9, an outlet connection 15 and a conduit 16 for conducting the fluid to a heat exchange unit 17 from which it flows back to the pump through a return connection 18. The heat transfer fluid is continuously circulated through the closed circuit and the same fluid is used during both the heating and the cooling portions of the crystallizing cycle. The heat transfer fluid is preferably a substance which will not corrode or rust the apparatus through which it circulates and is also a substance which will not form a sludge or other deposit which might reduce the heat transfer rate. Water treated with a scale preventing substance, such as the substance sold under the trade name "Calgon," is suitable for this purpose. Make up water may be added to the closed circuit from the condensate supply main, for example, by operation of a hand valve 20, and concentrated water solution may be drained off through hand-operated valve 20a. Air or other gas which may collect or form in the closed circuit may be removed by operation of an air vent valve 21 located at the top of a U-bend in the conduit 16.

The heat exchange unit 17 comprises a heat exchanger 22 for cooling the heat transfer fluid and a heat exchanger 23 for heating the fluid. The exchangers 22 and 23 are connected in series with respect to the closed fluid circuit. The exchanger 22 is supplied with cold water or other cooling medium through an inlet conduit 24 under control of a pneumatically operated diaphragm valve 25, and the waste water is discharged through a drain connection 26. A by-pass 27 is provided around the valve 25 and the flow of cooling medium may be controlled manually by a valve 28, the valve 25 being cut out of operation by closing manual valves 29. The exchanger 23 is supplied with steam or other suitable heating medium through a supply conduit 30 under control of a pneumatically operated diaphragm valve 32, and the exhaust steam is discharged through a connection 33 having a trap 34 therein. A by-pass 35 and manual valves 36 and 37 similar to the valves 28 and 29 are provided for manual control of the heating operation.

The heat exchanger 22 comprises a cylindrical tank forming the main portion thereof and inlet and outlet headers 38 and 39, respectively. The headers 38 and 39 are connected by a plurality of tubes 40 and the cooling medium flows over the outer surfaces of the tubes in a path determined by a plurality of baffles 41. The headers 38 and 39 are preferably divided into a plurality of sections (not shown) and the tubes 40 connected between the sections to provide several runs or passes in accordance with well known heat exchange practice. The heat transfer fluid is thus made to pass from one end of the exchanger 22 to the other several times before it is discharged to the exchanger 23. The heat exchanger 23 comprises a cylindrical tank or main body portion and inlet and outlet headers 42 and 43 respectively, connected by a plurality of tubes 44 passing through the main portion which comprises the steam space of the exchanger. The headers 42 and 43 are arranged so that the heat transfer fluid flows from the inlet header 42 through all the tubes 44 to the outlet header 43 in a single pass or run, the total cross-sectional area of the tubes 44 being substantially the same as the total cross-sectional area of the number of the tubes 40 which constitute a single pass of the heat exchanger 22.

During the crystallizing cycle the tank 8 is charged with treated mother liquor or massecuite which has been discharged from a vacuum pan at a temperature of about 70° C.; it is necessary to cool this mother liquor gradually to a temperature of between 30° C. and 35° C. to cause the desired amount and/or size of crystals to grow; the temperature of the liquid and crystals is then raised to say 50° C. to facilitate removal of the charge from the tank. After the removal of the crystallized solids and residue liquid, the tank is prepared for the next charge by again heating the heat transfer fluid to about 70° C. The manual control of the apparatus to follow this cycle and insure efficient and uniform operation is difficult and requires considerable skill. The crystallizing apparatus of the present invention as shown in the drawing is provided with an automatic controlling mechanism for selectively actuating the supply of heating and cooling medium to the exchangers 22 and 23 in such manner as to effect efficient and uniform crystallization.

The automatic control mechanism as shown in the drawing comprises a time controlled device 45 arranged to operate in conjunction with a temperature responsive control device 46 to actuate the pneumatic valves 25 and 32 in accordance with the required cycle. The timing device 45 is provided with a cam 47 driven by a synchronous timing motor 49 for determining the cycle of operation; the cam has been shown shaped to effect two complete cycles of operation in a single revolution; thus, if the cam rotates once a day each cycle will be performed in twelve hours. The cam 47 may be accurately shaped to determine the temperatures to be held and the rates of change of temperature during the cycle. The timing device also includes a cam 48 driven by the motor 49 and arranged to close a switch 50 during the heating portion of the cycle and energize solenoids 51 and 52 to operate three-way valves 53 and 54, respectively. The valves 53 and 54 are connected in the air lines to the pneumatic valves 25 and 32, respectively, and the position of the valves 53 and 54 determines whether the cooling medium or the heating medium is to be controlled by the temperature responsive device 46. When the valves 53 and 54 are in their lower positions as shown in the drawings, the switch 50 being open, the apparatus is operating in the cooling portion of the cycle, a cam follower 55 in a cam transmitter unit C being on the cooling control portion of the cam surface. The position of the cam follower 55 registered through a pneumatic receiver R determines the position of a bell crank 56 which adjusts the temperature held by the control device 46. The device 46 is provided with a coiled temperature responsive element 58 connected by the usual capillary tube to a thermal bulb 59 responsive to the temperature of the heat transfer fluid supplied to the heat exchange element 9. Expansion or contraction of the element 58 rocks a bell crank 60 rotatably mounted on the same axis as the crank 56. A control index pointer 63 also is mounted on this same axis, within the temperature responsive control device 46. Movement of the bell cranks 56 and 60 moves a link 61 pivoted on the crank 56, causing the arm 62 to engage a pivoted valve member 64 which controls an air jet or nozzle 65, the nozzle being opened by clockwise rotation of the crank 62 against the force of a spring 66.

When the cam follower 55 is in the position shown, the position of the transmitter unit C is such that the receiver R tends to exert a pull which will rotate the lever 56 in a clockwise direction; and the coiled element 58, which also acts similarly to a torsion spring, will tend to unroll when the temperature of the fluid is higher than that desired, so that the action of element 58 tends to reinforce the action of receiver R, the plunger of which is yieldable to movement imparted by element 58, due to the air pressure in receiver R. However, when the fluid has cooled to the desired temperature, the coil element 58 will contract and tend to rotate the levers 56 and 60 in a counter-clockwise direction, thereby causing valve 64 to be pushed away from nozzle 65. Thus, the thermostat element will cause valve 64 to open, in varying degrees, whenever the temperature of the fluid is lower than the preselected temperature, and to remain closed whenever the fluid temperature is higher than the preselected temperature. As a result, the valve 64 will remain closed during cooling of the fluid down to a predetermined temperature, and will remain open during heating up to a predetermined temperature.

The nozzle 65 is the pressure control jet of the pneumatic system for actuating the valves 25 and 32. The valves 25 and 32 are controlled in accordance with the air pressure supplied to their diaphragm chambers 68 and 69, respectively. The valve 25 is normally closed, it being spring biased to its closed position so that an increase in air pressure in the chamber 68 tends to open the valve 25 and increase the flow of cooling water to the heat exchanger. The steam valve 32 is normally open due to its spring bias and is closed upon an increase in pressure in the diaphragm chamber 69. It will thus be seen that a rise in temperature of the fluid in the closed circuit will cause an increase in the flow of cooling medium during the cooling cycle and a decrease in the flow of heating medium during the heating cycle.

The control mechanism may be of any suitable available type; in the arrangement illustrated, air under pressure from a supply pipe 70 is supplied through a bleeder tube 71 to a chamber 72 in communication with the nozzle 65. A bellows 73 in the chamber is arranged to actuate a valve 74 in a controlled pressure chamber 75. Operation of the valve 74 determines the pressure supplied to the valve diaphragm chambers 68 and 69 and is controlled by the operation of the valve 64. The chamber 75 is provided with a suitable bleeder orifice 76 to prevent the retaining of the higher pressure upon closing movement of the valve 74. A bellows 77 responsive to the pressure in the chamber 75 stabilizes the operation of the control and prevents overshooting or "hunting" by counteracting or checking the movements of the crank 62 to which the bellows is linked. When, for example, the valve 64 moves to the right to allow more air to be discharged from the nozzle 65 and decrease the pressure in the chamber 72, the bellows 73 expands to close the valve 74 and decrease the pressure in the chamber 75 and bellows 77; this tends to rotate the crank 62 counter-clockwise to move the valve 64 back toward its seat. The two actions result in stable operation at the desired pressure.

When the control is in the position shown in the drawing, full air pressure is admitted to the diaphragm chamber 69 to keep the steam valve 32 closed, and the air under the pressure controlled by the valve 74 is admitted to the diaphragm chamber 68 to actuate the cooling fluid valve 25. When the solenoids 51 and 52 are energized to reverse the valves 53 and 54 and start the heating cycle, the air in the chamber 68 is exhausted to the atmosphere through an orifice 80 and the valve 25 is closed by its spring to stop the flow of the cooling medium. The valve 54 in its upper position admits to the chamber 69 air under the pressure determined by the valve 74 to control the valve 32 and the flow of the heating medium.

A signal such as a light 81 may be associated with the timing mechanism 45 to indicate the initiation and duration of the heating portion of the cycle. It may also be desirable to indicate the termination of the reheating period governed by the cam surface 85. For this purpose an additional cam 88 driven by the motor 49 is provided to close a switch 89 and energize an alarm bell 90 as soon as the cam surface 85 has passed the follower 55. These signals assist the operator in synchronizing the preparation of a new charge with the termination of the crystallizing cycle. A two pen recording control thermometer 82 is provided to record the temperature of the heat transfer fluid and the temperature of the mother liquor in the crystallizer. The indicator is provided with temperature responsive elements 59 and 84 mounted in heat exchange relation with the heat transfer fluid and the mother liquor, respectively, and arranged in the usual manner to control the operation of the recording pens shown at 83a and 84a, respectively. The pen 83a traces a curve which has substantially the shape of the cam 47; the pen 84a traces a curve which differs from that of the pen 83a by the temperature difference between the heat transfer fluid and the charge in the tank 8.

The operation of the apparatus to provide efficient and uniform crystallization depends upon the correct shaping of the cam 47 to regulate the rates of temperature change throughout the cycle. The cam 47 rotates in a clockwise direction and the follower 55 has been shown on the cooling control portion of the cam surface; the reheating control portion of the cam indicated at 85 is followed by a portion 86 for maintaining substantially constant temperature which in turn is followed by a fluid heating portion 87 after which the cycle begins again with a second cooling control portion. The crystallized charge is removed from the tank and a new charge admitted during the portions of the cycle under control of the cam surfaces 86 and 87. As an example of a typical cycle the cam 47 may be provided with a cooling control surface which varies the temperature of the heating medium from about 70° C. at the end of the heating cycle to about 28° C. at the end of the cooling cycle; the portion 85 of the cam may control the reheating from 28° C. to 60° C. which temperature is held constant during the portion 86, the temperature finally being raised from 60° C. to 70° C. during control by the cam portion 87. A cam designed to maintain the foregoing temperatures would cool the massecuite from 70° C. to about 35° C. and then reheat the contents of the tank to about 50° C. before the emptying and recharging operations.

The construction and arrangement of the crystallizing apparatus described above makes it possible to decrease to a minimum the total necessary time for the operation and eliminates non-uniformity due to varying judgment of the operator. Furthermore, the operator or "sugar boiler" is kept informed as to the progress of the crystallizing cycle and the reheating signal enables him to synchronize the boiling and preparation of the subsequent charge with the time when the crystallizer is ready to receive the charge.

The arrangement of the heat exchangers 22 and 23 in series to heat or cool the heat transfer fluid selectively provides a rapid and efficient means for changing over from heating to cooling and vice versa. And the continuous circulation of the same charge of heat transfer fluid in the closed circuit minimizes corrosion, sludging, loss of liquid, and other difficulties encountered in open circulating systems.

While I have illustrated one embodiment of my invention in connection with a specific type of crystallizer, other applications will readily be apparent to those skilled in the art. I do not, therefore, desire my invention to be limited to the particular construction and arrangement shown and described and I intend by the appended claims to cover all embodiments within the spirit and scope of my invention.

What I claim and desire to secure by Letters Patent is:

1. In a crystallizer comprising a tank for holding a quantity of mother liquor and a heat transfer element for changing the temperature of the mother liquor, means providing a closed circuit for circulating heat exchange fluid through said element, means for heating the fluid in said closed circuit, means for cooling the fluid in said closed circuit, means automatically movable to a plurality of positions for selectively actuating said heating means and said cooling means, and means responsive to the temperature of said fluid for maintaining temperatures of said fluid predetermined in accordance with the position of said actuating means.

2. In a sugar crystallizer comprising a tank for holding a quantity of mother liquor and a heat transfer element for changing the temperature of the mother liquor, means providing a closed circuit for circulating heat exchange fluid through said element, first and second heat exchangers connected in series in said closed circuit, means for supplying heating medium to said second exchanger, means for supplying cooling medium to said first exchanger, means automatically movable to a plurality of positions for selectively actuating said heating and cooling medium supplying means, and means responsive to the temperature of said fluid for maintaining temperatures of said fluid predetermined in accordance with the position of said actuating means.

3. In a crystallizer comprising a tank for holding a quantity of mother liquor and a heat transfer element for changing the temperature of the mother liquor, means providing a closed circuit for circulating heat exchange fluid through said element, means for heating the fluid in said closed circuit, means for cooling the fluid in said closed circuit, means automatically movable to a plurality of positions for selectively actuating said heating means and said cooling means, means responsive to the temperature of said fluid for maintaining temperatures of said fluid predetermined in accordance with the position of said actuating means, and signalling means operated upon the actuation of said heating means for indicating the start of the heating period of said crystallizer.

4. In a crystallizer comprising a tank for holding a quantity of mother liquor and a heat transfer element for changing the temperature of the mother liquor, means for selectively supplying heating medium and cooling medium to said element, timing means for determining the cycle of operation of said supplying means, and means responsive to the temperature of the medium supplied to said element for controlling said supplying means to follow said cycle of operation.

5. In a crystallizer comprising a tank for holding a quantity of mother liquor and a heat transfer element for changing the temperature of the mother liquor, means for selectively supplying heating medium and cooling medium to said element, timing mechanism for determining the cycle of operation of said supplying means, means responsive to the temperature of the medium supplied to said element for controlling said supplying means to follow said cycle of operation, and means associated with said timing means for indicating the start of the supplying of heating medium to said element.

6. In a crystallizer comprising a tank for holding a quantity of mother liquor and a heat transfer element for changing the temperature of the mother liquor, means for selectively supplying heating medium and cooling medium to said element, timing mechanism for determining the cycle of operation of said supplying means, said cycle including a cooling period and a heating period, means responsive to the temperature of the medium supplied to said element for controlling said supplying means to follow said cycle of operation, and signalling means associated with said timing means for indicating the start and the duration of the reheating period of said cycle.

7. In a crystallizer comprising a tank for holding a quantity of mother liquor and a heat transfer element for changing the temperature of the mother liquor, means for selectively supplying heating medium and cooling medium to said element, timing means for determining the cycle of operation of said crystallizer including the periods of heating and cooling the mother liquor and the rates of heating and cooling, and means responsive to the temperature of the medium supplied to said element for controlling said supplying means to follow said cycle of operation.

8. In a crystallizer comprising a tank for holding a quantity of mother liquor and a heat transfer element for changing the temperature of the mother liquor, a heat transfer fluid circulating system for said element, means including a first control element for cooling the fluid in said system, means including a second control element for heating the fluid, said control elements being operative to determine the cycle of operation of said crystallizer, and means common to both control elements and responsive to the temperature of the heat transfer fluid in said system for actuating the selected one of said control elements.

9. In a crystallizer comprising a tank for holding a quantity of mother liquor and a heat transfer element for changing the temperature of the mother liquor, a system for selectively supplying heating medium and cooling medium to said element, timing means for determining the cycle of operation of said system, means responsive to the temperature of the medium supplied to said element for controlling said system to follow said cycle of operation, means including a first control valve for supplying cooling medium to said system, means including a second control valve for supplying heating medium to said system, pneumatic means responsive to the temperature of the heat transfer fluid in said system for actuating said control valves, timing means for determining the cycle of operation of said crystallizer, and valves actuated by said timing means for selectively connecting said first and second valves to said pneumatic means.

10. In a crystallizer comprising a tank for holding a quantity of mother liquor and a heat transfer element for changing the temperature of the mother liquor, a system for selectively supplying heating medium and cooling medium to said element, timing means for determining the cycle of operation of said system, means responsive to the temperature of the medium supplied to said element for controlling said system to follow said cycle of operation, means for supplying cooling medium to said system, means for supplying heating medium to said system, each of said means including a fluid pressure actuated control valve, one of said valves being normally open and the other normally closed, means responsive to the temperature of the fluid in said system for controlling the pressure of actuating fluid supplied to said valves, and cycle controlling means for selectively connecting either of said valves to said pressure controlling means.

11. In a crystallizer including a tank for holding a quantity of mother liquor, a stirring device having passages therein for circulation of a heat transfer fluid, means for supplying a heat transfer fluid to said stirring device, and means for supplying heating and cooling mediums in heat exchange relationship with said heat transfer fluid; means responsive to the temperature of said heat transfer fluid for controlling the amount of heating and cooling medium supplied; and means generally controlling said temperature responsive means for causing a cycle of operations to be followed, said operations including, in sequence, cooling said mother liquor to a predetermined temperature by cooling said heat transfer fluid progressively and maintaining said heat transfer fluid at a temperature lower than said mother liquor, heating said mother liquor for discharge from said crystallizer by progressively heating said heat transfer fluid to a temperature higher than the temperature of discharge of said mother liquor, and continued heating of said heat transfer fluid so as to heat said stirring device to a temperature approximately that of the next incoming quantity of mother liquor.

12. In a system for the treatment of sugar liquor to effect the growth of crystals therein, means for introducing a predetermined quantity of such liquor into crystallization zone for treatment; means for passing a heat transfer fluid in heat exchange relationship with said liquor; means for concurrently stirring said liquor; means for passing a cooling medium in heat exchange relationship with said fluid so as to cool said liquor and effect crystallization; means for controlling the temperature to which said liquor is cooled by controlling the amount of cooling medium in accordance with the temperature of said heat transfer fluid; means for passing a heating medium in heat exchange relationship with said fluid so as to heat said liquor prior to removal from said zone; and means for controlling the temperature to which said liquor is heated by controlling the amount of heating medium in accordance with the temperature of said heat transfer fluid.

JOHN E. MASON.

REFERENCES CITED

The following references are of record in the file of this patent:

UNITED STATES PATENTS

| Number | Name | Date |
| --- | --- | --- |
| 1,320,580 | Somerville | Nov. 4, 1919 |
| 1,550,860 | Wiseman | Aug. 25, 1925 |
| 1,557,093 | Roesch | Oct. 13, 1925 |
| 1,630,305 | Norwood | May 31, 1927 |
| 1,951,396 | Corbett | Mar. 20, 1934 |
| 2,161,847 | Blodgett | June 13, 1939 |
| 2,178,805 | Olcott | Nov. 7, 1939 |
| 2,254,387 | Olcott | Sept. 2, 1941 |
| 2,254,389 | Olcott | Sept. 2, 1941 |
| 2,302,469 | Patterson | Nov. 17, 1942 |